United States Patent
Sakurai et al.

(10) Patent No.: US 9,010,093 B2
(45) Date of Patent: Apr. 21, 2015

(54) EXHAUST GAS PURIFICATION APPARATUS FOR AN INTERNAL COMBUSTION ENGINE

(75) Inventors: Kenji Sakurai, Kyoto (JP); Toru Kidokoro, Hadano (JP); Yasuyuki Irisawa, Susono (JP); Yuji Miyoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/237,239

(22) PCT Filed: Sep. 6, 2011

(86) PCT No.: PCT/JP2011/070260
§ 371 (c)(1),
(2), (4) Date: Feb. 5, 2014

(87) PCT Pub. No.: WO2013/035159
PCT Pub. Date: Mar. 14, 2013

(65) Prior Publication Data
US 2014/0190150 A1      Jul. 10, 2014

(51) Int. Cl.
*F01N 3/00*      (2006.01)
*F01N 3/18*      (2006.01)
(Continued)

(52) U.S. Cl.
CPC *F01N 3/18* (2013.01); *F01N 3/085* (2013.01); *F01N 3/0885* (2013.01); *F01N 3/2073* (2013.01); *F01N 2610/02* (2013.01);
(Continued)

(58) Field of Classification Search
CPC ..... F01N 3/0814; F01N 3/0842; F01N 3/106; F01N 3/2066; F01N 13/08; F01N 3/035; F01N 13/009; F01N 13/0097; B01D 53/9472; B01D 53/9477
See application file for complete search history.

(56) References Cited

U.S. PATENT DOCUMENTS 6,941,742 B1 *    9/2005    Neufert et al. ............... 60/274
2003/0056499 A1   3/2003    Binder et al.
(Continued)

FOREIGN PATENT DOCUMENTS

EP    1 273 338 A1    1/2003
JP    2004-108176     4/2004
(Continued)

OTHER PUBLICATIONS

International Search Report issued Dec. 13, 2011, in PCT/JP11/070260 filed Sep. 6, 2011.

*Primary Examiner* — Jesse Bogue
(74) *Attorney, Agent, or Firm* — Oblon, McClelland, Maier & Neustadt, L.L.P.

(57) ABSTRACT

In cases where at the upstream side of an NOx selective reduction catalyst there is provided another catalyst, sulfur poisoning of both the catalysts is recovered in an appropriate manner. To this end, provision is made for an NH$_3$ generation catalyst arranged in an exhaust passage of an internal combustion engine for generating NH$_3$, the NOx selective reduction catalyst arranged in the exhaust passage at a location downstream of the NH$_3$ generation catalyst for reducing NOx in a selective manner, an upstream side recovery unit to recover sulfur poisoning of the NH$_3$ generation catalyst, and a downstream side recovery unit to recover sulfur poisoning of the NOx selective reduction catalyst after the sulfur poisoning of the NH$_3$ generation catalyst has been recovered by the upstream side recovery unit.

14 Claims, 5 Drawing Sheets

(51) Int. Cl.
  *F01N 3/08* (2006.01)
  *F01N 3/20* (2006.01)
  *F01N 13/00* (2010.01)
  *F01N 3/10* (2006.01)

(52) U.S. Cl.
  CPC .............. *Y02T 10/20* (2013.01); *F01N 13/009*
    (2013.01); *F01N 3/0842* (2013.01); *F01N*
    *3/101* (2013.01); *F01N 2550/03* (2013.01);
    *F01N 2570/24* (2013.01)

(56) References Cited

U.S. PATENT DOCUMENTS

2004/0139737 A1   7/2004  Binder et al.
2007/0082783 A1*  4/2007  Hu et al. .................... 477/100
2008/0286184 A1* 11/2008  Ando et al. ............... 423/213.5
2009/0158715 A1*  6/2009  Stroh et al. ................. 60/295
2012/0192549 A1*  8/2012  Sakurai ........................ 60/285
2013/0152552 A1*  6/2013  Sakurai et al. ............... 60/285
2014/0186220 A1*  7/2014  Sakurai et al. .............. 422/108

FOREIGN PATENT DOCUMENTS

| | | |
|---|---|---|
| JP | 2005-248869 | 9/2005 |
| JP | 2006-348874 | 12/2006 |
| JP | 2006-349025 | 12/2006 |
| JP | 2007-92609 | 4/2007 |
| WO | WO 2011/048666 A1 | 4/2011 |

\* cited by examiner

EXHAUST GAS PURIFICATION APPARATUS FOR AN INTERNAL COMBUSTION ENGINE

TECHNICAL FIELD

The present invention relates to an exhaust gas purification apparatus for an internal combustion engine.

BACKGROUND ART

There has been known a technique in which an NOx storage reduction catalyst (hereinafter referred to as an NSR catalyst) is disposed in an exhaust passage of an internal combustion engine. This NSR catalyst serves to occlude or store NOx contained in an incoming exhaust gas when the oxygen concentration of the exhaust gas is high, and to reduce the occluded or stored NOx when the oxygen concentration of the incoming exhaust gas becomes low and when a reducing agent exists.

The sulfur oxides (SOx) generated by the combustion of sulfur components included in fuel are occluded or stored in this NSR catalyst, similar to NOx. The SOx stored in this manner is more difficult to be released than NOx, and is accumulated into the NSR catalyst. This is referred to as sulfur poisoning. An NOx purification (i.e., removal and/or reduction) rate in the NSR catalyst is decreased due to this sulfur poisoning, and hence, it is necessary to carry out sulfur poisoning recovery treatment at appropriate times. This sulfur poisoning recovery treatment is carried out by circulating the exhaust gas, of which the oxygen concentration has been made low, through the NSR catalyst, with the temperature of the NSR catalyst being made high.

Thus, when the oxygen concentration is reduced to become a rich air fuel ratio at the time of recovery of sulfur poisoning, $H_2S$ may flow downstream of the NSR catalyst, so that a nasty smell may occur.

Here, there has been known a technique which suppresses the discharge of $H_2S$ by carrying out a lean spike in which an air fuel ratio is adjusted to a lean air fuel ratio only in a short period of time at a predetermined point in time, while making a target air fuel ratio to be a rich air fuel ratio at the time of sulfur poisoning recovery treatment (for example, refer to a first patent document). In this technique, the interval or duration in which the lean spike is carried out is made longer in accordance with the decreasing amount of deposit or storage of sulfur components.

In addition, there has also been known another technique of oxidizing $H_2S$ by supplying secondary air at the time of sulfur poisoning recovery treatment (for example, refer to a second patent document).

Moreover, there has also been known a further technique in which air is supplied to a catalyst by opening a throttle valve during a deceleration fuel cut-off operation, so that the catalyst is put into an oxidized state, thereby suppressing the generation of $H_2S$ (for example, refer to a third patent document).

Further, there has also been known a technique of suppressing the generation of $H_2S$ by making longer the period of time of a fuel cut-off operation (for example, refer to a fourth patent document).

Furthermore, there has also been known a technique in which in cases where an exhaust gas purification catalyst is in a state to generate a nasty smell at the time of carrying out fuel cut-off control, the flow rate of air flowing into the exhaust gas purification catalyst is controlled to become larger than that at the time of idling (for example, refer to a fifth patent document).

However, an NOx selective reduction catalyst (hereinafter also referred to as an SCR catalyst) can be provided at the downstream side of an NSR catalyst or a three-way catalyst in which sulfur poisoning occurs. This SCR catalyst is a catalyst which serves to carry out selective reduction of NOx by means of a reducing agent. Then, sulfur poisoning may be caused in the SCR catalyst by the $H_2S$ which flows out of the NSR catalyst. Here, in this conventional technique, no mention is made to sulfur poisoning recovery treatment of both the catalysts in the case of the SCR catalyst being provided at the downstream side of the NSR catalyst. For this reason, there is a fear that sulfur poisoning recovery may not be carried out in an appropriate manner. For this reason, there is a fear that $H_2S$ may be released into the atmospheric air, thereby giving off a nasty smell. In addition, the removal or reduction rate of NOx may also be decreased.

PRIOR ART REFERENCES

Patent Documents

[First Patent Document] Japanese patent application laid-open No. 2004-108176
[Second Patent Document] Japanese patent application laid-open No. 2005-248869
[Third Patent Document] Japanese patent application laid-open No. 2006-348874
[Fourth Patent Document] Japanese patent application laid-open No. 2006-349025
[Fifth Patent Document] Japanese patent application laid-open No. 2007-092609

SUMMARY OF THE INVENTION

Problems to be Solved by the Invention

The present invention has been made in view of the problems as mentioned above, and the object of the invention is that in cases where at the upstream side of an NOx selective reduction catalyst, there is provided another catalyst, sulfur poisoning of both the catalysts is recovered in an appropriate manner.

Means for Solving the Problem

In order to achieve the above-mentioned object, an exhaust gas purification apparatus for an internal combustion engine according to the present invention is provided with:

an $NH_3$ generation catalyst that is arranged in an exhaust passage of the internal combustion engine and generates $NH_3$;

an NOx selective reduction catalyst that is arranged in the exhaust passage at a location downstream of said $NH_3$ generation catalyst, and reduces NOx in a selective manner;

an upstream side recovery unit that recovers sulfur poisoning of said $NH_3$ generation catalyst; and a downstream side recovery unit that recovers sulfur poisoning of said NOx selective reduction catalyst after the sulfur poisoning of said $NH_3$ generation catalyst has been recovered by said upstream side recovery unit.

The $NH_3$ generation catalyst is a catalyst which causes $H_2$ or HC to react with NO thereby to generate $NH_3$, for example. In addition, the $NH_3$ generation catalyst is a catalyst which is poisoned by sulfur components in the exhaust gas. Here, when the upstream side recovery unit recovers the sulfur poisoning of the $NH_3$ generation catalyst, $H_2S$ is generated depending on conditions. This $H_2S$ flows into the NOx selective reduction catalyst provided at the downstream side. Then, this $H_2S$ is adsorbed by the NOx selective reduction catalyst. With this, sulfur poisoning is generated in the NOx storage reduction catalyst, too. That is, the amount of $NH_3$ able to be adsorbed decreases in accordance with the amount of adsorption of $H_2S$.

Then, the downstream side recovery unit recovers the sulfur poisoning of the NOx selective reduction catalyst after the sulfur poisoning of the $NH_3$ generation catalyst has been recovered by the upstream side recovery unit. In other words, after $H_2S$ flows out of the $NH_3$ generation catalyst and is then adsorbed or stored in the NOx selective reduction catalyst, the sulfur poisoning of the NOx selective reduction catalyst is recovered. Here, the temperature of the $NH_3$ generation catalyst goes up at the time of the sulfur poisoning recovery of the $NH_3$ generation catalyst. With this, the temperature of the NOx selective reduction catalyst goes up. Accordingly, by carrying out the sulfur poisoning recovery of the NOx selective reduction catalyst, after carrying out the sulfur poisoning recovery of the $NH_3$ generation catalyst, the sulfur poisoning recovery of the NOx selective reduction catalyst can be carried out in a state where the temperature thereof is high. As a result of this, the recovery of the sulfur poisoning of the NOx selective reduction catalyst can be promoted.

In addition, the NOx selective reduction catalyst adsorbs the $H_2S$ generated at the time of the sulfur poisoning recovery of the $NH_3$ catalyst, thus making it possible to suppress a nasty smell from being generated by $H_2S$ at the time of the sulfur poisoning recovery of the $NH_3$ catalyst. Then, after that, when the air fuel ratio of the exhaust gas passing through the NOx selective reduction catalyst is a lean air fuel ratio, $H_2S$ is changed to SOx and discharged, so that the generation of a nasty smell is suppressed. Moreover, by recovering the sulfur poisoning of the $NH_3$ generation catalyst, the NOx storage ability thereof is recovered, and at the same time, the $NH_3$ generation ability thereof is recovered, so that $NH_3$ can be supplied to the NOx selective reduction catalyst as a reducing agent. As a result of this, it is possible to enhance the removal rate of NOx.

Here, note that the time at which the downstream side recovery unit recovers the sulfur poisoning of the NOx selective reduction catalyst may be set to be immediately after the sulfur poisoning of the $NH_3$ generation catalyst has been recovered by the upstream side recovery unit. In addition, this time may also be set to be when the temperature of the NOx selective reduction catalyst is higher than before the recovery of the sulfur poisoning of the $NH_3$ generation catalyst is started, due to the influence that the sulfur poisoning of the $NH_3$ generation catalyst has been recovered. Moreover, this time may also be set to be when the influence due to the recovery of the sulfur poisoning of the $NH_3$ generation catalyst remains on the $NH_3$ generation catalyst or the NOx selective reduction catalyst. The recovery of the sulfur poisoning by the upstream side recovery unit and the recovery of the sulfur poisoning by the downstream side recovery unit may be carried out continuously, or may be carried out at a certain amount of interval therebetween.

Moreover, in the present invention, said downstream side recovery unit may suppress the temperature of said NOx selective reduction catalyst having gone up at the time when said upstream side recovery unit has recovered the sulfur poisoning of said $NH_3$ generation catalyst from falling after the recovery of the sulfur poisoning of said $NH_3$ generation catalyst.

For example, the downstream side recovery unit maintains the temperature of the $NH_3$ generation catalyst or the NOx selective reduction catalyst at the time when the recovery of the sulfur poisoning of the $NH_3$ generation catalyst has been completed, as it is. In addition, for example, the downstream side recovery unit makes long a period of time in which the temperature of the $NH_3$ generation catalyst or the NOx selective reduction catalyst having gone up at the time when the sulfur poisoning of the $NH_3$ generation catalyst has been recovered falls to the temperature thereof before the recovery of the sulfur poisoning of the $NH_3$ generation catalyst. Moreover, for example, the downstream side recovery unit makes the temperature of the $NH_3$ generation catalyst or the NOx selective reduction catalyst after the recovery of the sulfur poisoning of the $NH_3$ generation catalyst higher than that at the time of the recovery thereof.

Here, the higher the temperature of NOx selective reduction catalyst, the more the recovery of the sulfur poisoning of the NOx selective reduction catalyst can be promoted. Also, the higher the temperature of the $NH_3$ generation catalyst, the higher the temperature of the NOx selective reduction catalyst becomes, too, so the recovery of the sulfur poisoning of the NOx selective reduction catalyst can be promoted. Accordingly, by suppressing the temperature of the $NH_3$ generation catalyst or the NOx selective reduction catalyst from falling after the sulfur poisoning of the $NH_3$ generation catalyst has been recovered, it is possible to promote the recovery of the sulfur poisoning of the NOx selective reduction catalyst. In addition, at this time, by making the air fuel ratio of the exhaust gas to be a stoichiometric air fuel ratio or a lean air fuel ratio, $H_2S$ will be changed to SOx, so it will be possible to suppress the $H_2S$ from being discharged into the atmospheric air.

Further, in the present invention, said downstream side recovery unit can carry out the recovery of the sulfur poisoning by making an amount of oxygen flowing into said NOx selective reduction catalyst in a predetermined period of time after the sulfur poisoning of said $NH_3$ generation catalyst has been recovered by said upstream side recovery unit larger than an amount of oxygen flowing into said NOx selective reduction catalyst after said predetermined period of time.

This predetermined period of time may also be set as a period of time in which $H_2S$ is adsorbed to the NOx selective reduction catalyst, or a period of time taken for the $H_2S$ adsorbed to the NOx selective reduction catalyst to decrease to within an allowable range. In addition, the predetermined period of time may also be set as a period of time taken for the amount of emission of $H_2S$ to become within an allowable range. Moreover, the beginning of the predetermined period of time may also be set as immediately after the sulfur poisoning of the $NH_3$ generation catalyst has been recovered by the upstream side recovery unit, or may also be set as a point in time some time after the sulfur poisoning of the $NH_3$ generation catalyst has been recovered. Here, the larger the amount of oxygen flowing into the NOx selective reduction catalyst, the easier it becomes for $H_2S$ to change to SOx. For this reason, by increasing the amount of oxygen flowing into the NOx selective reduction catalyst, it is possible to suppress the generation of a nasty smell. In addition, the NOx selective reduction catalyst can adsorb $NH_3$ in an early period of time.

Here, note that the total sum of the amount of oxygen flowing into the NOx selective reduction catalyst in a predetermined period of time after the recovery of the sulfur poisoning by the upstream side recovery unit has been completed may be made larger than the total sum of the amount of oxygen flowing into the NOx selective reduction catalyst in the following same period of time. In addition, the amount of oxygen per unit time flowing into the NOx selective reduction catalyst in a predetermined period of time after the recovery of the sulfur poisoning by the upstream side recovery unit has been completed may be made larger than the amount of oxygen per unit time flowing into the NOx selective reduction catalyst thereafter.

In addition, in the present invention, said downstream side recovery unit can make the air fuel ratio of the exhaust gas to be higher in said predetermined period of time than after said predetermined period of time.

That is, by making the air fuel ratio of the exhaust gas higher, a larger amount of oxygen can be made to flow into the NOx selective reduction catalyst.

Moreover, in the present invention, said downstream side recovery unit can make an amount of intake air in said internal combustion engine larger in said predetermined period of time than after said predetermined period of time.

That is, by making the amount of intake air larger, a larger amount of oxygen can be made to flow into the NOx selective reduction catalyst, even if the air fuel ratio is the same.

Further, in the present invention, said downstream side recovery unit can make a period of time after the sulfur poisoning of said $NH_3$ generation catalyst has been recovered by said upstream side recovery unit until a reducing agent is first supplied to said $NH_3$ generation catalyst to be longer than intervals between first and subsequent supplies of the reducing agent.

For example, in cases where the $NH_3$ generation catalyst is an NOx storage reduction catalyst, the reducing agent is supplied in order to reduce the NOx having been stored therein. This reducing agent is supplied in cases where a storage amount of NOx becomes equal to or greater than a threshold value, or it is supplied at every prescribed period of time. Accordingly, the reducing agent is supplied in cases where the storage amount of NOx becomes equal to or greater than the threshold value after the sulfur poisoning recovery has been completed, or in cases where the prescribed period of time has elapsed after that. When the air fuel ratio is decreased due to such a supply of the reducing agent, $H_2S$ desorbs from the NOx selective reduction catalyst, and besides can be discharged without being changed to SOx.

On the other hand, the downstream side recovery unit makes long the period of time until the reducing agent is first supplied to the $NH_3$ generation catalyst. According to this, the amount of oxygen flowing into the NOx selective reduction catalyst in a predetermined period of time after the recovery of the sulfur poisoning by the upstream side recovery unit can be made larger than the amount of oxygen flowing into the NOx selective reduction catalyst after the predetermined period of time. Here, note that within the predetermined period of time, the supply of the reducing agent may not be carried out.

In addition, in the present invention, said NOx selective reduction catalyst may be composed including a base metal.

In such an NOx selective reduction catalyst, $H_2S$ can be adsorbed thereto, and then at the time of a lean air fuel ratio, the $H_2S$ thus adsorbed can be discharged while being made to change to SOx. The base metal may also be Cu or Fe, Ca, for example. As a result of this, a maximum value of the amount of $H_2S$ per unit time being discharged to the downstream side of the NOx selective reduction catalyst can be made small, thus making it possible to suppress the generation of a nasty smell.

Effect of the Invention

According to the present invention, in cases where at the upstream side of an NOx selective reduction catalyst, there is provided another catalyst, it is possible to recover sulfur poisoning of both the catalysts in an appropriate manner.

MODES FOR CARRYING OUT THE INVENTION

Hereinafter, reference will be made to specific embodiments of an exhaust gas purification apparatus for an internal combustion engine according to the present invention based on the attached drawings.

First Embodiment

Figure 1:
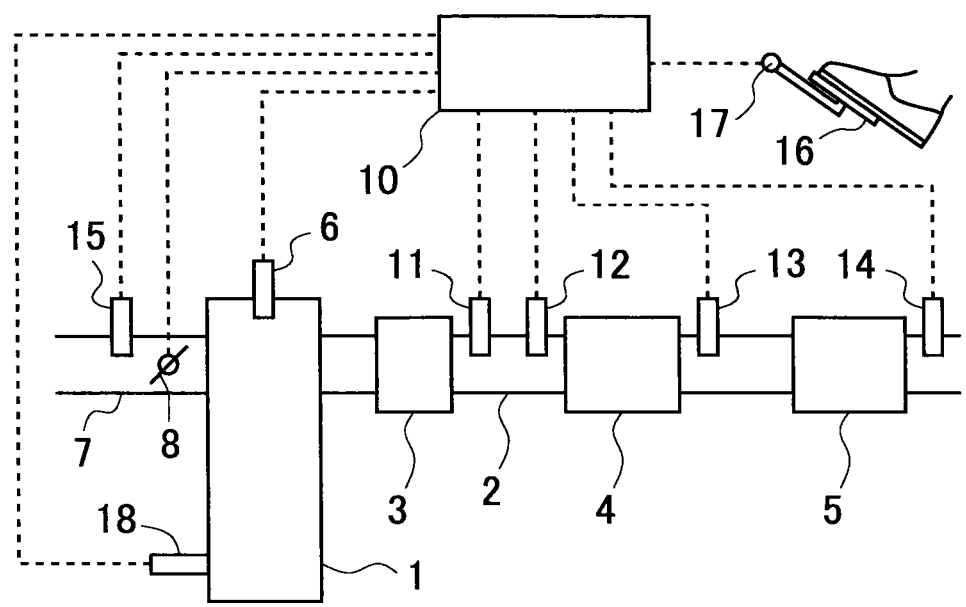
FIG. 1 is a view showing the schematic construction of an internal combustion engine as well as its intake and exhaust systems according to an embodiment of the present invention.

FIG. 1 is a view showing the schematic construction of an internal combustion engine as well as its intake and exhaust systems according to this embodiment of the present invention. An internal combustion engine 1 shown in FIG. 1 is a gasoline engine, but it may be a diesel engine. The internal combustion engine 1 is installed on a vehicle, for example.

An exhaust passage 2 is connected to the internal combustion engine 1. In the middle of the exhaust passage 2, a three-way catalyst 3, a NOx storage reduction catalyst 4 (hereinafter referred to as an NSR catalyst 4) and a NOx selective reduction catalyst 5 (hereinafter referred to as an SCR catalyst 5) are sequentially provided in this order from an upstream side.

The three-way catalyst 3 serves to remove NOx, HC and CO with a maximum efficiency at the time when a catalytic atmosphere is at a stoichiometric air fuel ratio. In addition, the three-way catalyst 3 has oxygen storage ability. That is, when the air fuel ratio of an incoming exhaust gas is a lean air fuel ratio, the three-way catalyst 3 occludes or stores an excess of oxygen, whereas when the air fuel ratio of the incoming exhaust gas is a rich air fuel ratio, the three-way catalyst 3 releases a shortage of oxygen, thereby purifying the exhaust gas.

By the action of such oxygen storage ability, the three-way catalyst 3 can purify or remove HC, CO and NOx, even if the air fuel ratio of the incoming exhaust gas is other than the stoichiometric air fuel ratio. That is, by the action of the oxygen storage ability, it becomes possible to expand the range of the air fuel ratio (also being referred to as a purification window) in which the three-way catalyst 3 can remove HC, CO and NOx at a predetermined ratio or above.

In addition, the NSR catalyst 4 has a function of occluding or storing NOx contained in the incoming exhaust gas when the oxygen concentration of the exhaust gas is high, and of reducing the occluded or stored NOx when the oxygen concentration of the incoming exhaust gas becomes low and when the reducing agent exists. For the reducing agent to be supplied to the NSR catalyst 4, there can be used HC or CO which is the unburnt fuel discharged from the internal combustion engine 1.

Here, note that when the exhaust gas passes through the three-way catalyst 3 or the NSR catalyst 4, the NOx in the exhaust gas may react with HC or $H_2$ to generate ammonia ($NH_3$). That is, in this embodiment, the three-way catalyst 3 or the NSR catalyst 4 corresponds to an $NH_3$ generation catalyst in the present invention. Here, note that in this embodiment, the three-way catalyst 3 or the NSR catalyst 4 is used as the $NH_3$ generation catalyst, but instead of this, other exhaust gas purification catalysts may be used which can generate $NH_3$ and can be poisoned by sulfur components in the exhaust gas.

The SCR catalyst 5 has a function of adsorbing or storing the reducing agent, and carrying out selective reduction of NOx by means of the reducing agent thus adsorbed or stored at the time when the NOx passes through the SCR catalyst. The SCR catalyst 5 is composed of zeolite including a base metal such as Cu or Fe. For the SCR catalyst 5, there can be used Cu/MFI or Fe/MFI, for example. For the reducing agent to be supplied to the SCR catalyst 5, there can be used $NH_3$ generated by the three-way catalyst 3 or the NSR catalyst 4.

Moreover, a first temperature sensor 11 for detecting the temperature of the exhaust gas and an air fuel ratio sensor 12 for detecting the air fuel ratio of the exhaust gas are mounted on the exhaust passage 2 at locations downstream of the three-way catalyst 3 and upstream of the NSR catalyst 4. Here, note that the temperature of the three-way catalyst 3 or the temperature of the NSR catalyst 4 can be measured by the first temperature sensor 11. Also, the air fuel ratio of the exhaust gas in the internal combustion engine 1 or the air fuel ratio of the exhaust gas flowing into the NSR catalyst 4 can be detected by the air fuel ratio sensor 12.

Further, a second temperature sensor 13 for detecting the temperature of the exhaust gas is mounted on the exhaust passage 2 at a location downstream of the NSR catalyst 4 and upstream of the SCR catalyst 5. Here, note that the temperature of the NSR catalyst 4 or the temperature of the SCR catalyst 5 can be detected by the second temperature sensor 13.

Furthermore, a third temperature sensor 14 for detecting the temperature of the exhaust gas is mounted on the exhaust passage 2 at a location downstream of the SCR catalyst 5. Here, note that the temperature of the SCR catalyst 5 can be detected by the third temperature sensor 14.

Note that it is not necessary to mount all the above-mentioned sensors, but some of them may be selected and mounted in a suitable manner.

In addition, on the internal combustion engine 1, there is mounted a fuel injection valve 6 for supplying fuel to the internal combustion engine 1.

On the other hand, an intake passage 7 is connected to the internal combustion engine 1. A throttle valve 8 for regulating an amount of intake air in the internal combustion engine 1 is arranged in the middle of the intake passage 7. Also, an air flow meter 15 for detecting the amount of intake air in the internal combustion engine 1 is mounted on the intake passage 7 at a location upstream of the throttle valve 8.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements.

Further, besides the above-mentioned sensors, an accelerator opening sensor 17, which serves to detect an engine load by outputting an electrical signal corresponding to an amount by which a driver depressed an accelerator pedal 16, and a crank position sensor 18, which serves to detect the number of revolutions per unit time of the engine, are connected to the ECU 10 through electrical wiring, and the output signals of these variety of kinds of sensors are inputted to the ECU 10.

On the other hand, the injection valve 6 and the throttle valve 8 are connected to the ECU 10 through electrical wiring, so that the opening and closing timing of the injection valve 6 and the degree of opening of the throttle valve 8 are controlled by means of the ECU 10.

For example, the ECU 10 decides a required amount of intake air from the accelerator opening degree detected by the accelerator opening sensor 17, and the number of engine revolutions per unit time detected by the crank position sensor 18. Then, the degree of opening of the throttle valve 8 is controlled so as to achieve the required amount of intake air. The injection valve 6 is controlled in such a manner as to supply an amount of fuel injection in accordance with the amount of intake air which changes at this time. The air fuel ratio set at this time is 25, for example, which is hereinafter referred to as an ordinary air fuel ratio. This ordinary air fuel ratio is an air fuel ratio which is set according to the operating state of the internal combustion engine 1. The internal combustion engine 1 according to this embodiment is driven in a lean burn operation at times other than during a rich spike period and a sulfur poisoning recovery period, and so, the ordinary air fuel ratio is a lean air fuel ratio.

In addition, the ECU 10 carries out a reduction treatment for the NOx stored in the NSR catalyst 4. At the time of reducing the NOx stored in the NSR catalyst 4, so-called rich spike control is carried out in which the air fuel ratio of the exhaust gas flowing into the NSR catalyst 4 is caused to decrease to a predetermined rich air fuel ratio by regulating the amount of fuel to be injected from the injection valve 6 or the degree of opening of the throttle valve 8.

This rich spike control is carried out in cases where the amount of NOx stored in the NSR catalyst 4 becomes a predetermined amount. The amount of NOx stored in the NSR catalyst 4 is calculated, for example, by integrating a difference between the amount of NOx flowing into the NSR catalyst 4 and the amount of NOx flowing out of the NSR catalyst 4. The amount of NOx flowing into the NSR catalyst 4 and the amount of NOx flowing out of the NSR catalyst 4 can be detected by provision of sensors. In addition, the rich spike control may be carried out at every predetermined period of time or at every predetermined distance of travel.

Further, in order to recover the NSR catalyst 4 from sulfur poisoning, the ECU 10 carries out sulfur poisoning recovery treatment for the NSR catalyst 4. This sulfur poisoning recovery treatment is carried out by controlling the air fuel ratio of the exhaust gas to a predetermined rich air fuel ratio (e.g., 25), after raising the temperature of the NSR catalyst 4 to a temperature (e.g., 650 degrees C. or above) which is required for sulfur poisoning recovery. Here, note that when the temperature of the NSR catalyst 4 is caused to rise, the amount of fuel to be injected from the injection valve 6 or the degree of opening of the throttle valve 8 may be decided in such a manner that the air fuel ratio of the exhaust gas becomes a lean air fuel ratio.

Here, note that the air fuel ratio at the time of sulfur poisoning recovery and the air fuel ratio at the time of NOx reduction (at the time of rich spike control) may be the same value, or may be different values. In addition, the air fuel ratio at the time of rich spike control may also be set to a value which is equal to or less than the stoichiometric air fuel ratio and is higher than 14.3. The air fuel ratio at the time of sulfur poisoning recovery and the air fuel ratio at the time of NOx reduction (at the time of rich spike control) are set to be air fuel ratios within the purification window of the three-way catalyst 3. Then, the sulfur poisoning recovery treatment is carried out for 10 minutes, for example. This period of time is set in advance as a period of time until the sulfur poisoning recovery treatment is completed. Here, note that it is not necessary to cause all the sulfur components to be released from the NSR catalyst 4.

Then, after the sulfur poisoning recovery treatment is completed, the air fuel ratio of the exhaust gas is returned to the ordinary air fuel ratio. The word "ordinary" means the time in which rich spike control or sulfur poisoning recovery control is not carried out. In addition, as described above, the ordinary air fuel ratio is an air fuel ratio which is set according to the operating state of the internal combustion engine 1, and is an air fuel ratio when rich spike control or sulfur poisoning recovery control is not carried out.

That is, the ECU 10 sets the air fuel ratio to 25 when not carrying out sulfur poisoning recovery or NOx reduction, and sets the air fuel ratio to be rich at the time of sulfur poisoning recovery or NOx reduction.

However, in cases where the SCR catalyst 5 is provided at the downstream side of the NSR catalyst 4, even when the sulfur poisoning of the NSR catalyst 4 has occurred, NOx is able to be reduced by means of the SCR catalyst 5. For this reason, a decrease in the NOx reduction rate as the entire exhaust gas purification apparatus is smaller than in the case where the SCR catalyst 5 is not provided. Here, even if sulfur poisoning occurs in the NSR catalyst 4, $NH_3$, which is generated by the reaction of NOx and the reducing agent in the NSR catalyst 4, is used as the reducing agent in the SCR catalyst 5. That is, NOx is purified or reduced by $NH_3$ in the SCR catalyst 5. However, it has been found out that when sulfur poisoning occurs in the NSR catalyst 4, not only the NOx occlusion or storage ability is reduced, but the $NH_3$ generation ability is also reduced. Accordingly, there is a fear that when the sulfur poisoning of the NSR catalyst 4 occurs, the NOx reduction rate in the SCR catalyst 5 may also be reduced.

Here, at the time of the sulfur poisoning recovery of the NSR catalyst 4, the ECU 10 controls the injection valve 6 or the throttle valve 8 in such a manner that the internal combustion engine 1 is driven to operate at a rich air fuel ratio of 14.3. When a variation in the air fuel ratio occurs at this time to cause the air fuel ratio to become 14 or less, for example, there will be a fear that the sulfur components desorbed from the NSR catalyst 4 may change to $H_2S$. This is not favorable because a nasty smell will be generated if this $H_2S$ is released into the atmospheric air as it is.

In contrast to this, in this embodiment, the SCR catalyst 5 is provided at the downstream side of the NSR catalyst 4. This SCR catalyst 5 adsorbs $H_2S$. When the internal combustion engine 1 is operated at a lean air fuel ratio, the $H_2S$ adsorbed to the SCR catalyst 5 will be desorbed from the SCR catalyst 5, so that it will be changed to SOx with the action of oxygen in the exhaust gas, and released into the atmospheric air.

Figure 2:
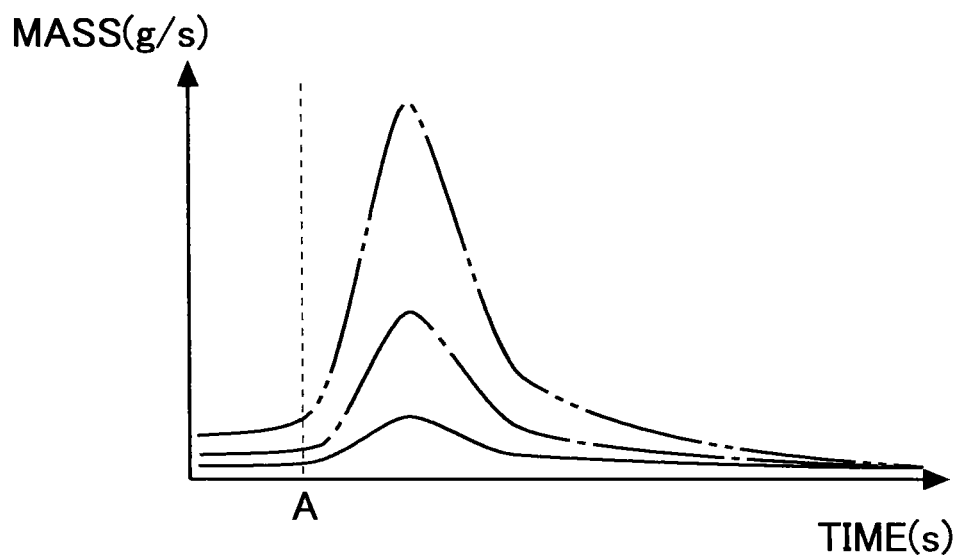
FIG. 2 is a time chart showing changes over time of a mass of $H_2S$ and a total mass of SOx and $H_2S$.

Here, FIG. 2 is a time chart showing changes over time of a mass of $H_2S$ and a total mass of SOx and $H_2S$. Before a point in time indicated at A, the exhaust gas is a lean air fuel ratio, and after the point in time indicated at A, the air fuel ratio is a rich air fuel ratio of, for example, 12. The air fuel ratio after the point in time indicated at A is richer than that at the time of carrying out sulfur poisoning recovery treatment, and is to generate $H_2S$ in a positive manner for the purpose of experiments. A solid line indicates the mass of $H_2S$ flowing out of the SCR catalyst 5 per unit time. In addition, an alternate long and short dash line indicates a mass of $H_2S$ flowing into the SCR catalyst 5 per unit time. Here, note that the alternate long and short dash line may indicate a mass of $H_2S$ flowing out of the NSR catalyst 4 per unit time, or may also indicate a mass of $H_2S$ passing through the exhaust passage 2 per unit time, in cases where the SCR catalyst 5 is not provided. Moreover, an alternate long and two short dashes line indicates a total sum of masses of SOx and $H_2S$ flowing out of the NSR catalyst 4 per unit time. Here, note that Cu/MFI is used for the SCR catalyst 5.

In FIG. 2, the difference between the alternate long and two short dashes line and the alternate long and short dash line can be made to be the masses of $SO_2$ and $SO_3$. In addition, in FIG. 2, the difference between the alternate long and short dash line and the solid line can be made to be the mass of $H_2S$ which has been absorbed by the SCR catalyst 5. That is, when the exhaust gas passes through the SCR catalyst 5, the mass of $H_2S$ decreases. It is considered that this decrease of $H_2S$ is adsorbed by the SCR catalyst 5. Thus, it was found out that in cases where the SCR catalyst 5 composed including Cu such as Cu/MFI was used, not only $NH_3$ but also $H_2S$ was adsorbed.

Figure 3:
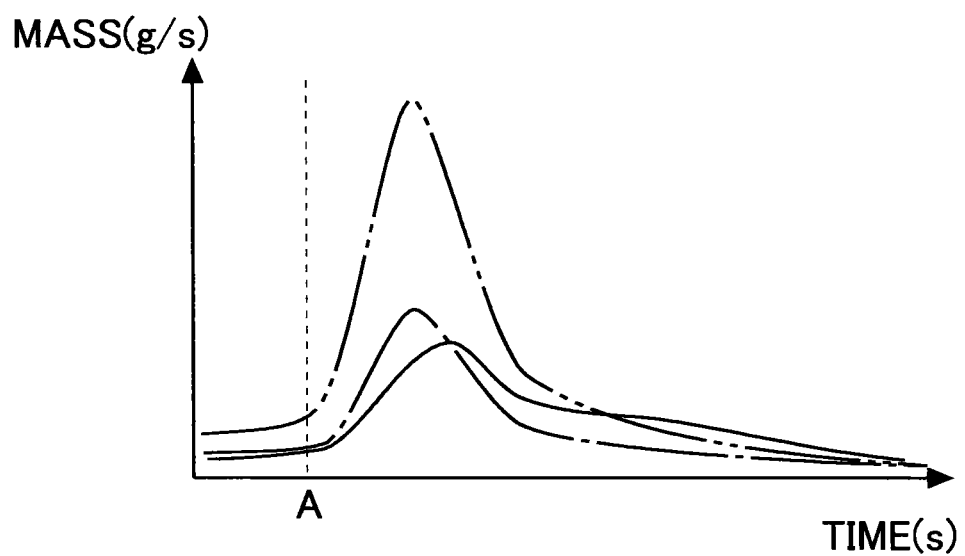
FIG. 3 is a time chart showing a change over time of the mass of $H_2S$ in the case of using Fe/MFI as an SCR catalyst.

Next, FIG. 3 is a time chart showing a change over time of the mass of $H_2S$ in the case of using Fe/MFI as the SCR catalyst 5. The meanings of a solid line, an alternate long and short dash line, and an alternate long and two short dashes line are the same as in FIG. 2.

In FIG. 3, when a comparison is made between the solid line and the alternate long and short dash line, it turns out that a maximum value of the solid line is smaller than a maximum value of the alternate long and short dash line. That is, when the exhaust gas passes through the SCR catalyst 5, a maximum value of the mass of $H_2S$ decreases. This means that $H_2S$ is adsorbed to the SCR catalyst 5. However, it turns out that after the solid line has become its maximum value, the solid line is larger than the alternate long and short dash line. That is, after the mass of $H_2S$ becomes the maximum value, the mass of $H_2S$ at the downstream side of the SCR catalyst 5 becomes larger than that at the upstream side thereof. Thus, it is considered that in cases where the solid line is larger than the alternate long and short dash line, $H_2S$ has been desorbed from the SCR catalyst 5.

That is, it is considered that in cases where the SCR catalyst 5 composed including Fe such as Fe/MFI is used, even if $H_2S$ is adsorbed to the SCR catalyst 5, the $H_2S$ thus adsorbed will be desorbed therefrom after that. For this reason, the effect of decreasing the mass of $H_2S$ flowing out of the SCR catalyst 5 is small. However, when the SCR catalyst 5 once adsorbs $H_2S$, the maximum value of the mass of $H_2S$ can be made small, thus providing an effect of suppressing a nasty smell.

Here, note that when the internal combustion engine 1 is operated at a lean air fuel ratio, the $H_2S$ having been adsorbed to the SCR catalyst is changed to SOx by oxygen in the exhaust gas, and flows out of the SCR catalyst 5. As a result, the generation of a nasty smell can be suppressed.

However, in cases where there are many opportunities to carry out sulfur poisoning recovery treatment of the NSR catalyst 4, the possibility of $H_2S$ being generated also becomes high. Besides, when $H_2S$ is adsorbed to the SCR catalyst 5 each time the sulfur poisoning recovery treatment of the NSR catalyst 4 is carried out, $NH_3$ will become accordingly more difficult to be adsorbed to the SCR catalyst 5. That is, in the SCR catalyst 5, when $H_2S$ is adsorbed, prior to $NH_3$, into pores into which $NH_3$ is to be adsorbed, it becomes impossible for the pores to adsorb $NH_3$. Then, as the amount of adsorption of $H_2S$ in the SCR catalyst 5 increases, $NH_3$ for reduction of NOx is running short, thus giving rise to a fear that the removal or reduction rate of NOx may decrease.

Accordingly, in this embodiment, after carrying out the sulfur poisoning recovery treatment of the NSR catalyst 4, $H_2S$ is caused to desorb from the SCR catalyst 5. Here, by supplying a large amount of oxygen to the SCR catalyst 5, the $H_2S$ adsorbed by the SCR catalyst 5 can be caused to discharge as SOx. For example, immediately after completion of the sulfur poisoning recovery treatment of the NSR catalyst 4, the air fuel ratio is set to 26, and after the time taken to remove $H_2S$ from the SCR catalyst 5 has elapsed, the air fuel ratio is set to the ordinary value of 25. That is, the air fuel ratio immediately after completion of the sulfur poisoning recovery treatment of the NSR catalyst 4 is made higher than the ordinary air fuel ratio. In addition, the space velocity (SV) of the exhaust gas passing through the SCR catalyst 5 may be caused to increase, for example, by increasing the amount of intake air in the internal combustion engine 1 in a period of time after the sulfur poisoning recovery treatment of the NSR catalyst 4 has been completed until a first rich spike is carried out, more than that after the first rich spike has been carried out. According to these, the amount of oxygen flowing into the SCR catalyst 5 increases in a predetermined period of time, thereby making it possible to desorb $H_2S$ as SOx in a quick manner.

In addition, the period of time or interval after the sulfur poisoning recovery treatment of the NSR catalyst 4 has been completed until the first rich spike is carried out may be made longer than intervals between the first and subsequent rich spikes. That is, the period of time until the first rich spike is carried out becomes longer, so that the more amount of oxygen can be supplied to the SCR catalyst 5, thereby making it possible to desorb $H_2S$ as SOx in a quick manner. Moreover, for example, a rich spike may be prohibited until a period of time required to remove $H_2S$ elapses after the sulfur poisoning recovery treatment of the NSR catalyst 4 has been completed.

Figure 4:
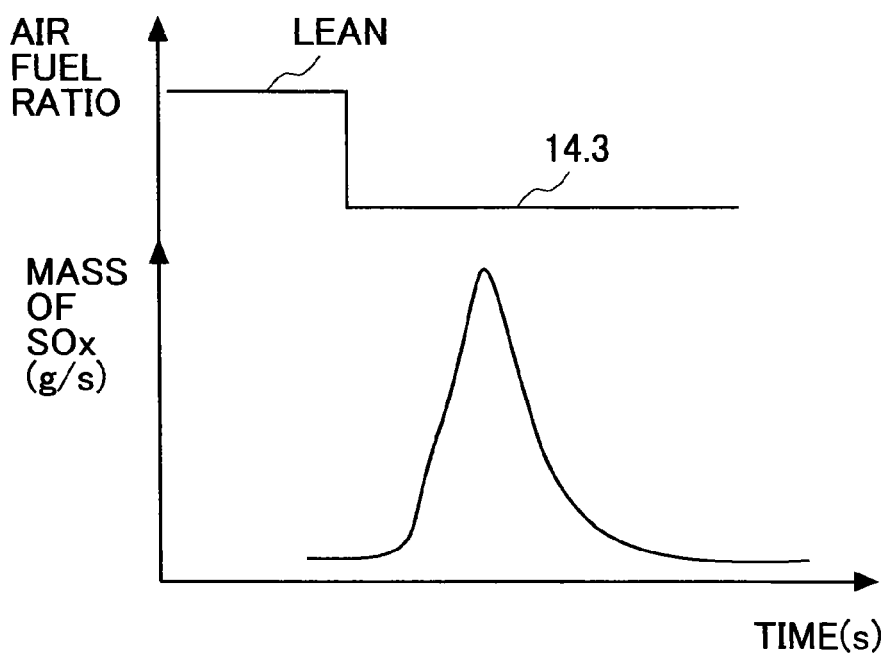
FIG. 4 is a time chart showing changes over time of an air fuel ratio and a mass of SOx flowing out of an NSR catalyst, at the time of carrying out sulfur poisoning recovery treatment of the NSR catalyst.

Here, FIG. 4 is a time chart showing changes over time of the air fuel ratio and the mass of SOx flowing out of the NSR catalyst 4, at the time of carrying out sulfur poisoning recovery treatment of the NSR catalyst 4. The sulfur poisoning recovery treatment is carried out for about 10 minutes. The air fuel ratio at this time is 14.3, for example. When the sulfur poisoning recovery treatment is completed, the mass of SOx flowing out of the NSR catalyst 4 will be relatively small. After that, $H_2S$ is removed from the SCR catalyst 5.

Figure 5:
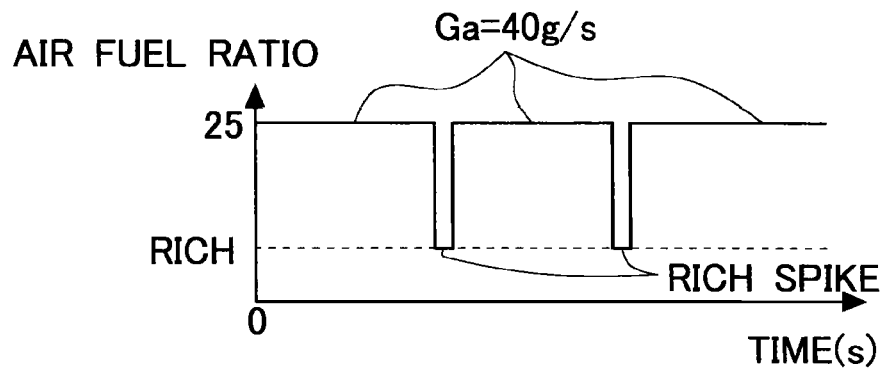
FIG. 5 is a time chart showing a change over time of an air fuel ratio when a sufficient period of time has elapsed from the sulfur poisoning recovery treatment of the NSR catalyst.
Figure 6:
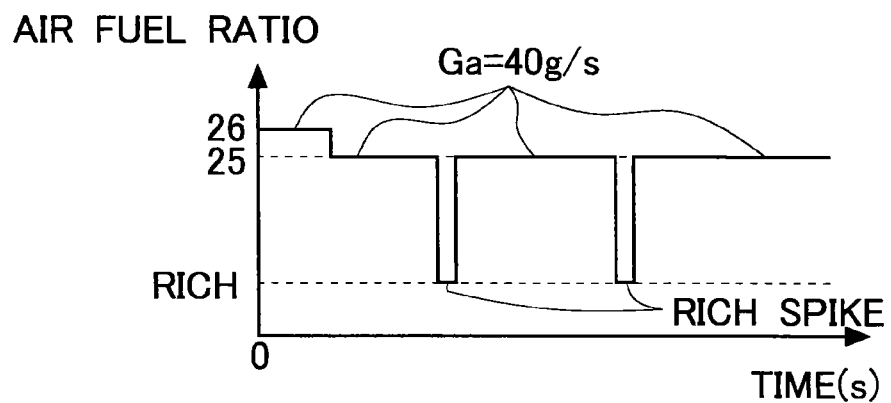
FIG. 6 is a time chart showing a change over time of an air fuel ratio when the air fuel ratio is set to 26 during the time a rich spike is not carried out within a predetermined period of time immediately after the sulfur poisoning recovery treatment of the NSR catalyst has been completed.
Figure 7:
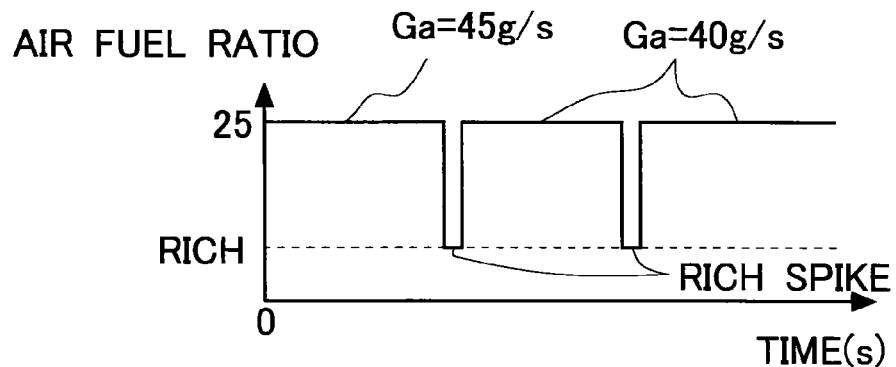
FIG. 7 is a time chart showing a change over time of an air fuel ratio when an amount of intake air is set to 45 g/s during the time a rich spike is not carried out within the predetermined period of time immediately after the sulfur poisoning recovery treatment of the NSR catalyst has been completed.

FIG. 5 is a time chart showing a change over time of the air fuel ratio when a sufficient period of time has elapsed from the sulfur poisoning recovery treatment of the NSR catalyst 4. Here, note that this air fuel ratio may also be a value detected by a sensor, or may also be a target value set by the ECU 10. In FIG. 5 and FIGS. 6, 7 to be described later, when the time point is 0, the sulfur poisoning recovery treatment of the NSR catalyst 4 is completed. FIG. 5 shows the change over time of the air fuel ratio in a state where $H_2S$ is not substantially adsorbed to the SCR catalyst 5 because a sufficient period of time has elapsed from the sulfur poisoning recovery treatment of the NSR catalyst 4. That is, it is the change over time of the air fuel ratio when the control for desorbing $H_2S$ is not carried out. In FIG. 5, the air fuel ratio when a rich spike is not carried out is 25, and the amount of intake air at this time is 40 g/s, for example. The air fuel ratio at this time is the above-mentioned ordinary air fuel ratio.

FIG. 6 is a time chart showing a change over time of the air fuel ratio when the air fuel ratio is set to 26 during the time a rich spike is not carried out within a predetermined period of time immediately after the sulfur poisoning recovery treatment of the NSR catalyst 4 has been completed. That is, the air fuel ratio is set higher in comparison with when a sufficient period of time has elapsed from the sulfur poisoning recovery treatment of the NSR catalyst 4. The period of time in which the air fuel ratio is set higher can be obtained through experiments, etc., in advance as the period of time required to remove $H_2S$ from the SCR catalyst 5. Here, note that the amount of intake air is the same as in the case of FIG. 5. Thus, by setting the air fuel ratio to be high in the predetermined period of time, a more amount of oxygen will be supplied to the SCR catalyst 5, so that $H_2S$ is caused to desorb as SOx.

FIG. 7 is a time chart showing a change over time of the air fuel ratio when the amount of intake air is set to 45 g/s during the time a rich spike is not carried out within the predetermined period of time immediately after the sulfur poisoning recovery treatment of the NSR catalyst 4 has been completed. That is, the amount of intake air is increased in comparison with when a sufficient period of time has elapsed from the sulfur poisoning recovery treatment of the NSR catalyst 4. The period of time in which the amount of intake air is increased can be obtained through experiments, etc., in advance as the period of time required to remove $H_2S$ from the SCR catalyst 5. In addition, the period of time in which the amount of intake air is increased may also be set as the period of time after the sulfur poisoning recovery treatment of the NSR catalyst 4 has been completed until the first rich spike is carried out. Here, note that the air fuel ratio is 25, which is the same as in the case of FIG. 5. Thus, by increasing the amount of intake air in the predetermined period of time, a more amount of oxygen will be supplied to the SCR catalyst 5, so that $H_2S$ is caused to desorb as SOx.

Thus, the more amount of oxygen can be supplied to the SCR catalyst 5 by making the air fuel ratio high or increasing the amount of intake air in this manner. As a result of this, $H_2S$ is caused to desorb as SOx in a quick manner. In addition, it becomes possible for the SCR catalyst 5 to adsorb $NH_3$ which is required for the reduction of NOx, so that the removal or reduction rate of NOx can be enhanced. Here, note that the air fuel ratio can be changed by adjusting the amount of fuel injected from the injection valve 6 or the degree of opening of the throttle valve 8. Moreover, the amount of intake air can be changed by adjusting the degree of opening of the throttle valve 8. Here, note that in cases where the air fuel ratio is not changed at the time of increasing the amount of intake air, the amount of fuel injection is increased in accordance with the amount of intake air.

Figure 8:
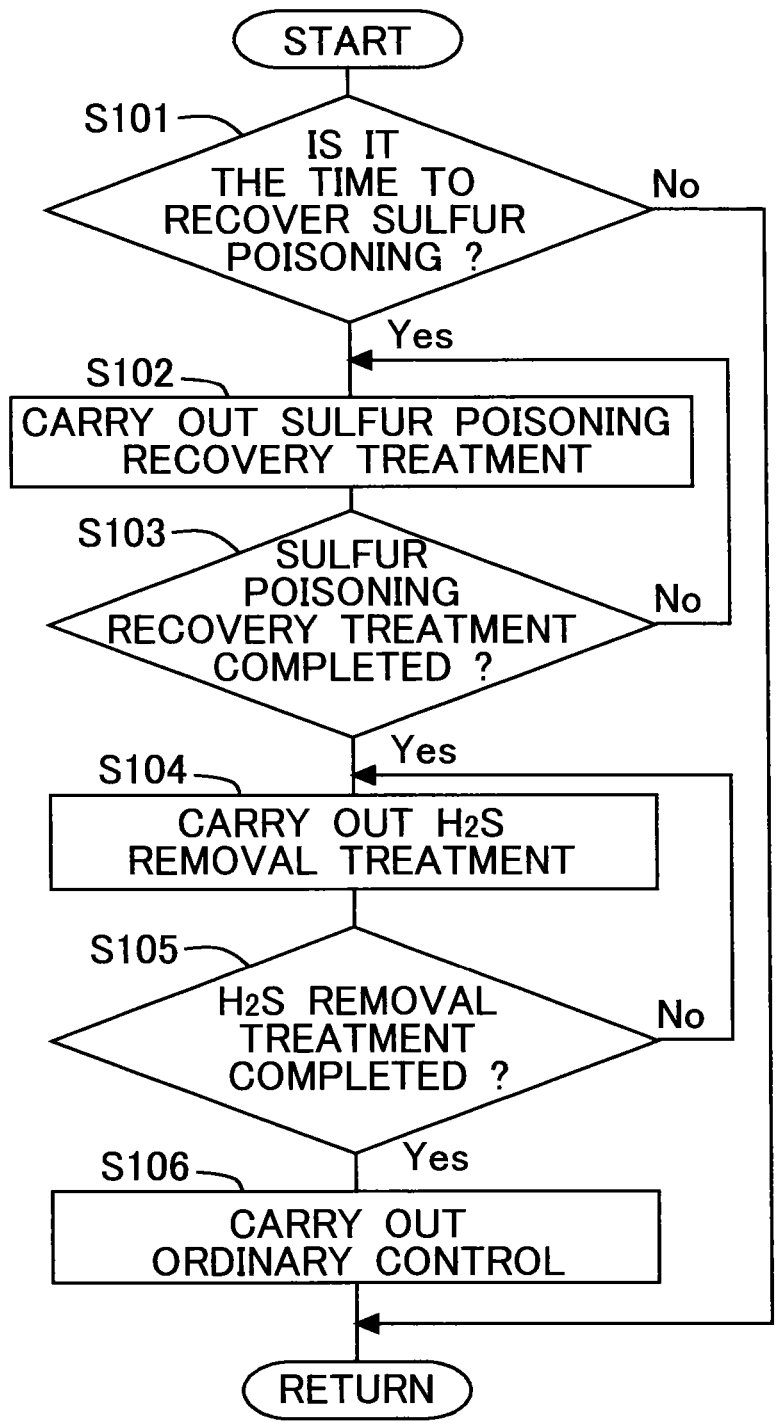
FIG. 8 is a flow chart showing a flow of air fuel ratio control according to the embodiment.

Next, FIG. 8 is a flow chart showing a flow or routine of air fuel ratio control according to this embodiment. This routine is carried out by means of the ECU 10 at each predetermined time interval.

In step S101, it is determined whether it is the time to carry out sulfur poisoning recovery treatment. This sulfur poisoning recovery treatment is a treatment for recovering the sulfur poisoning of the NSR catalyst 4. In this step, it may be determined whether there is any fear that the removal or reduction rate of NOx in the NSR catalyst 4 may become less than an allowable range due to the SOx having been stored in the NSR catalyst 4. Here, it may be difficult to detect the mass of SOx having been stored by the NSR catalyst 4. For this reason, for example, when the operation time of the internal combustion engine 1 becomes equal to or greater than a prescribed period of time from the last sulfur poisoning recovery treatment, a determination may be made that it is the time to carry out sulfur poisoning recovery treatment. In addition, each time the mileage (distance of travel) of the vehicle on which the internal combustion engine 1 is mounted reaches a prescribed mileage or distance, a determination may be made that it is the time to carry out sulfur poisoning recovery treatment. Moreover, for example, the amount of SOx occluded or stored in the NSR catalyst 4 may be estimated, and it may be determined whether the amount of SOx thus estimated has become equal to or greater than a threshold value. This amount of SOx may be estimated by means of well-known techniques.

Then, in cases where an affirmative determination is made in step S101, the routine goes to step S102. On the other hand, in cases where a negative determination is made in step S101, there is no need to carry out the sulfur poisoning recovery treatment of the NSR catalyst 4, and hence, this routine is ended.

In step S102, sulfur poisoning recovery treatment is carried out with respect to the NSR catalyst 4. First, the temperature of the NSR catalyst 4 is raised to a temperature (e.g., 650 degrees C.) necessary for sulfur poisoning recovery. Here, note that at the time of raising the temperature of the NSR catalyst 4, the air fuel ratio may also be set as a lean air fuel ratio. Then, the air fuel ratio is set as a predetermined rich air fuel ratio (e.g., 14.3) suitable for releasing SOx. Here, note that in this embodiment, the ECU 10, which carries out the processing of step S102, corresponds to an upstream side recovery unit in the present invention.

In step S103, it is determined whether the sulfur poisoning recovery treatment of the NSR catalyst 4 has been completed. For example, when the time elapsed after the sulfur poisoning recovery treatment of the NSR catalyst 4 was started becomes equal to or greater than a prescribed period of time, a determination is made that the sulfur poisoning recovery treatment of the NSR catalyst 4 has been completed. In cases where an affirmative determination is made in step S103, the routine advances to step S104. On the other hand, in cases where a negative determination is made in step S103, the routine returns to step S102, where the sulfur poisoning recovery treatment of the NSR catalyst 4 is continued.

In step S104, $H_2S$ removal treatment is carried out. The $H_2S$ removal treatment is processing for removing $H_2S$ from the SCR catalyst 5. This can be said to be a treatment for recovering the sulfur poisoning of the SCR catalyst 5. In this step, processing for causing the $H_2S$ adsorbed or stored by the SCR catalyst 5 to be released quickly is carried out. That is, the air fuel ratio is made high, or the amount of intake air is increased. Here, note that the period of time after the sulfur poisoning recovery treatment of the NSR catalyst 4 is completed until the first rich spike is carried out may be extended. That is, by the time the first rich spike is carried out, a more amount of oxygen should just be supplied to the SCR catalyst 5. Here, when a rich spike is carried out in a state where the SCR catalyst 4 has adsorbed or stored $H_2S$, there will be a fear that $H_2S$ may be released into the atmospheric air, while having not been changed to SOx. As a result, this is suppressed. The $H_2S$ removal treatment may be carried out continuously with the sulfur poisoning recovery treatment of step S102, or may be carried out in a certain interval therefrom. Here, note that in this embodiment, the ECU 10, which carries out the processing of step S104, corresponds to a downstream side recovery unit in the present invention.

In step S105, it is determined whether the $H_2S$ removal treatment has been completed. For example, when the time elapsed after the $H_2S$ removal treatment was started becomes equal to or greater than a predetermined period of time, a determination is made that the $H_2S$ removal treatment has been completed. This predetermined period of time has been obtained through experiments, etc. In cases where an affirmative determination is made in step S105, the routine advances to step S106. On the other hand, in cases where a negative determination is made in step S105, a return is made to step S104, where the $H_2S$ removal treatment is continued.

In step S106, ordinary control is carried out. The ordinary control referred to herein means that the internal combustion engine 1 is operated with the ordinary air fuel ratio, and a rich spike is carried out when the amount of NOx stored in the NSR catalyst 4 becomes equal to or greater than the threshold value.

As described above, according to this embodiment, $H_2S$ can be removed from the SCR catalyst 4 immediately after the sulfur poisoning recovery treatment of the NSR catalyst 4 has been carried out. As a result of this, it is possible to suppress a decrease in the removal rate of NOx.

In addition, the $NH_3$ generation ability in the NSR catalyst 4 is recovered by the sulfur poisoning recovery treatment, so that the reducing agent can be suppressed from running short in the SCR catalyst 5, thereby making it possible to suppress the decrease of the NOx removal or reduction rate.

Moreover, $H_2S$ can be caused to be adsorbed to the SCR catalyst 5, and thereafter can be caused to discharge as SOx. For this reason, the concentration of $H_2S$ flowing out to the downstream side of the SCR catalyst 5 can be reduced, thus making it possible to suppress the generation of a nasty smell.

However, in the case of the SCR catalyst 5 composed including Cu such as Cu/MFI, Cu and $H_2S$ react with each other to generate copper sulfate. This copper sulfate is water soluble, so there is a fear that Cu may be lost from the SCR catalyst 5 due to moisture in the exhaust gas. On the other hand, by removing $H_2S$ quickly, it is possible to suppress the loss of Cu from the SCR catalyst 5, thus making it possible to suppress the decrease in the removal or reduction rate of NOx.

In this manner, according to this embodiment, the sulfur poisoning of the NSR catalyst 4 and the SCR catalyst 5 can be recovered in an appropriate manner.

Second Embodiment

In this second embodiment, after the sulfur poisoning recovery treatment of the NSR catalyst 4 has been completed, a fall in the temperature of the NSR catalyst 4 or the SCR catalyst 5 is suppressed. Here, when the sulfur poisoning recovery treatment of the NSR catalyst 4 is carried out, the temperature of the NSR catalyst 4 is caused to go up. That is, the temperature of the NSR catalyst 4 becomes higher than before the sulfur poisoning recovery treatment is carried out. Then, as the temperature of the NSR catalyst 4 becomes higher, the temperature of the SCR catalyst 5 at the downstream side thereof will also become higher. As a result, the desorption of $H_2S$ from the SCR catalyst 5 is promoted. The other devices and so on are the same as those in the first embodiment, so the explanation thereof is omitted.

Here, note that in this embodiment, the temperature of the NSR catalyst 4 or the SCR catalyst 5 at the time of the completion of the sulfur poisoning recovery treatment of the NSR catalyst 4 may be maintained as it is. In addition, the rate of fall of the temperature of the NSR catalyst 4 or the SCR catalyst 5 may be made slow. Moreover, the temperature of the NSR catalyst 4 or the SCR catalyst 5 may be maintained higher than before the sulfur poisoning recovery treatment of the NSR catalyst 4 is carried out. Further, the temperature of the NSR catalyst 4 or the SCR catalyst 5 may be made higher than at the time when the sulfur poisoning recovery treatment of the NSR catalyst 4 has been completed. Furthermore, after the temperature of the NSR catalyst 4 or the SCR catalyst 5 has fallen after the completion of the sulfur poisoning recovery treatment of the NSR catalyst 4, the temperature of the NSR catalyst 4 or the SCR catalyst 5 may be caused to go up again.

For example, the temperature of the NSR catalyst 4 or the SCR catalyst 5 may also be set to a temperature (e.g., 650 degrees C.) which is sufficient as a temperature required to cause $H_2S$ to be desorbed from the SCR catalyst 5. In addition, for example, in cases where the sulfur poisoning recovery treatment of the NSR catalyst 4 is not carried out, the temperature of the NSR catalyst 4 or the SCR catalyst 5 may also be maintained at 450 degrees C. which is higher than in an engine operating state where the temperature of the NSR catalyst 4 becomes 420 degrees C.

Here, note that, by increasing the amount of fuel injection or by changing valve timing or the amount of valve lift, it is possible to suppress the fall of the temperature of the NSR catalyst 4 or the SCR catalyst 5. Further, the NSR catalyst 4 or the SCR catalyst 5 may be heated by the use of an electric heater. In addition, for example, in cases where provision is made for an EGR system, the fall of the temperature of the NSR catalyst 4 or the SCR catalyst 5 can be suppressed by stopping the supply of an EGR gas. Moreover, the fall of the temperature of the NSR catalyst 4 or the SCR catalyst 5 can also be suppressed by making the air fuel ratio lower than the ordinary air fuel ratio or by retarding ignition timing.

In this manner, the fall of the temperature of the SCR catalyst 5 can be suppressed. Here, the higher the temperature of the SCR catalyst 5, the easier it becomes for $H_2S$ to be desorbed from the SCR catalyst 5. Then, if the air fuel ratio of the exhaust gas is the stoichiometric air fuel ratio or a lean air fuel ratio, $H_2S$ will be changed to SOx, so it is possible to suppress the $H_2S$ from being discharged into the atmospheric air. Here, note that if the control to supply a more amount of oxygen to the SCR catalyst 5 as explained in the first embodiment is used together, $H_2S$ can be made to discharge as SOx more quickly.

Here, note that in this example, reference has been made to an example in which an exhaust gas purification apparatus is applied to a gasoline engine, but it can also be applied to a diesel engine. Here, note that in cases where an exhaust gas purification apparatus is applied to a diesel engine, the fall of the temperature of the NSR catalyst 4 or the SCR catalyst 5 can be suppressed by carrying out at least one of changing of an amount of main injection, changing of main injection timing, addition of after injection, changing of after injection timing, addition of post injection, and changing of post injection timing. In addition, in the case of the diesel engine, fuel may be added into the exhaust gas, and/or the NSR catalyst 4 or the SCR catalyst 5 may be heated by means of a burner or an electric heater.

Then, in this embodiment, in step S104 in the flow shown in FIG. 8 of the first embodiment, the fall of the temperature of the NSR catalyst 4 or the SCR catalyst 5 is suppressed, as $H_2S$ removal treatment. At this time, the processing in step S104 as explained in the first embodiment may be carried out in combination therewith. Here, note that in this embodiment, the ECU 10, which carries out the processing of step S104, corresponds to a downstream side recovery unit in the present invention.

As described above, according to this embodiment, by suppressing the temperature having gone up at the time of the sulfur poisoning recovery of the NSR catalyst 4 from falling thereafter, it is possible to cause $H_2S$ to be desorbed from the SCR catalyst 5 in a quick manner. As a result of this, it is possible to suppress a decrease in the removal or reduction rate of NOx.

In addition, the $NH_3$ generation ability in the NSR catalyst 4 is recovered by the sulfur poisoning recovery treatment, so that the reducing agent can be suppressed from running short in the SCR catalyst 5, thereby making it possible to suppress the decrease of the NOx removal or reduction rate.

Moreover, $H_2S$ can be caused to be adsorbed to the SCR catalyst 5, and thereafter can be caused to discharge as SOx. For this reason, the concentration of $H_2S$ flowing out to the downstream side of the SCR catalyst 5 can be reduced, thus making it possible to suppress the generation of a nasty smell.

Further, it is possible to suppress the loss of Cu from the SCR catalyst 5, so that the decrease in the removal or reduction rate of NOx can be suppressed.

Thus, according to this embodiment, the sulfur poisoning of the NSR catalyst 4 and the SCR catalyst 5 can be recovered in an appropriate manner.

EXPLANATION OF REFERENCE NUMERALS AND CHARACTERS 1 internal combustion engine
2 exhaust passage
3 three-way catalyst
4 NOx storage reduction catalyst (NSR catalyst)
5 NOx selective reduction catalyst (SCR catalyst)
6 injection valve
7 intake passage
8 throttle valve
10 ECU
11 first temperature sensor
12 air fuel ratio sensor
13 second temperature sensor
14 third temperature sensor
15 air flow meter
16 accelerator pedal
17 accelerator opening sensor
18 crank position sensor

The invention claimed is:

1. An exhaust gas purification apparatus, comprising:
an $NH_3$ generation catalyst arranged in an exhaust passage of an internal combustion engine, wherein the generation catalyst is configured to generate $NH_3$;
an NOx selective reduction catalyst arranged in the exhaust passage at a location downstream of the $NH_3$ generation catalyst, wherein the reduction catalyst is configured to reduce NOx in a selective manner;
an upstream side recovery unit configured to recover sulfur poisoning of the $NH_3$ generation catalyst; and
a downstream side recovery unit configured to recover sulfur poisoning of the NOx selective reduction catalyst after the sulfur poisoning of the $NH_3$ generation catalyst has been recovered by the upstream side recovery unit.

2. The exhaust gas purification apparatus of claim 1, wherein the downstream side recovery unit is adapted to suppress a temperature of the NOx selective reduction catalyst, which had gone up when the upstream side recovery unit recovered the sulfur poisoning of the NH$_3$ generation catalyst, from falling after recovery of the sulfur poisoning of the NH$_3$ generation catalyst.

3. The exhaust gas purification of claim 1, wherein the downstream side recovery unit is adapted to carry out the recovery of the sulfur poisoning by making an amount of oxygen flowing into the NOx selective reduction catalyst in a predetermined period of time after the sulfur poisoning of the NH3 generation catalyst was recovered by the upstream side recovery unit larger than an amount of oxygen flowing into the NOx selective reduction catalyst after the predetermined period of time.

4. The exhaust gas purification apparatus of claim 3, wherein the downstream side recovery unit is adapted to make an air fuel ratio of an exhaust gas to be higher in the predetermined period of time than after the predetermined period of time.

5. The exhaust gas purification apparatus of claim 3, wherein the downstream side recovery unit is adapted to make an amount of intake air in the internal combustion engine larger in the predetermined period of time than after the predetermined period of time.

6. The exhaust gas purification apparatus of claim 3, wherein the downstream side recovery unit is adapted to make a period of time after the sulfur poisoning of the NH$_3$ generation catalyst has been recovered by the upstream side recovery unit until a reducing agent is first supplied to the NH$_3$ generation catalyst to be longer than intervals between first and subsequent supplies of the reducing agent.

7. The exhaust gas purification apparatus of claim 1, wherein the NOx selective reduction catalyst comprises a base metal.

8. An exhaust gas purification apparatus, comprising:
an NH$_3$ generation catalyst arranged in an exhaust passage of an internal combustion engine, wherein the generation catalyst is configured to generate NH$_3$;
an NOx selective reduction catalyst arranged in the exhaust passage at a location downstream of the NH$_3$ generation catalyst, wherein the reduction catalyst is configured to reduce NOx in a selective manner;
an upstream side recovery unit configured to recover sulfur poisoning of the NH$_3$ generation catalyst by adapting the internal combustion engine to operate at a rich air fuel ratio; and
a downstream side recovery unit configured to recover sulfur poisoning of the NOx selective reduction catalyst by adapting the internal combustion engine to operate at a lean air fuel ratio after the sulfur poisoning of the NH$_3$ generation catalyst has been recovered by the upstream side recovery unit.

9. The exhaust gas purification apparatus of claim 8, wherein the downstream side recovery unit is adapted to suppress a temperature of the NOx selective reduction catalyst, which had gone up when the upstream side recovery unit recovered the sulfur poisoning of the NH$_3$ generation catalyst, from falling after recovery of the sulfur poisoning of the NH$_3$ generation catalyst.

10. The exhaust gas purification apparatus of claim 8, wherein the downstream side recovery unit is adapted to carry out the recovery of the sulfur poisoning by making an amount of oxygen flowing into the NOx selective reduction catalyst in a predetermined period of time after the sulfur poisoning of the NH$_3$ generation catalyst was recovered by the upstream side recovery unit larger than an amount of oxygen flowing into the NOx selective reduction catalyst after the predetermined period of time.

11. The exhaust gas purification apparatus claim 10, wherein the downstream side recovery unit is adapted to make an air fuel ratio of an exhaust gas to be higher in the predetermined period of time than after the predetermined period of time.

12. The exhaust gas purification apparatus of claim 10, wherein the downstream side recovery unit is adapted to make an amount of intake air in the internal combustion engine larger in the predetermined period of time than after the predetermined period of time.

13. The exhaust gas purification apparatus of claim 10, wherein the downstream side recovery unit is adapted to make a period of time after the sulfur poisoning of the NH$_3$ generation catalyst has been recovered by the upstream side recovery unit until a reducing agent is first supplied to the NH$_3$ generation catalyst to be longer than intervals between first and subsequent supplies of the reducing agent.

14. The exhaust gas purification apparatus of claim 8, wherein the NOx selective reduction catalyst comprises a base metal.

* * * * *